Sept. 8, 1936.　　　　G. GODDU　　　　2,053,331

METHOD OF MAKING INSOLES

Original Filed Nov. 20, 1931

INVENTOR:
George Goddu, deed.
Isabelle W. Goddu,
Executrix
By her Attorney
Harlow M. Davis Patented Sept. 8, 1936

2,053,331

UNITED STATES PATENT OFFICE 2,053,331

METHOD OF MAKING INSOLES

George Goddu, deceased, late of Winchester, Mass., by Isabelle W. Goddu, executrix, Winchester, Mass., assignor to The Littleway Process Company, Lynn, Mass., a corporation of Massachusetts Original application November 20, 1931, Serial No. 576,342. Divided and this application April 13, 1934, Serial No. 720,451

23 Claims. (Cl. 36—22)

This invention relates to the art of shoemaking and is disclosed herein by way of illustration with reference to insoles adapted for use in the manufacture of shoes the uppers of which are secured in overlasted relation to sole members by cement and to methods of making such insoles. The present application is a division of a copending application Serial No. 576,342, filed Nov. 20, 1931, in the name of George Goddu (Patent No. 2,017,856, granted October 22, 1935) which is directed to improvements in methods of making shoes.

Objects of the present invention are to provide improved insoles which will be particularly adapted to meet conditions found in the commercial manufacture of shoes of the type referred to and which will present advantages in the way of economy; and to provide an improved method adapted for use in making such insoles.

Considering the invention first in its article or insole aspect, the illustrated insole, which preferably is of leather, has a single integral lip at each side of the insole extending from toe to breast line, the continuity of the lip being broken at the toe. Both lips extend inwardly with their bases located at a considerable distance in from the edge of the insole to provide a wide feather portion. Preferably, the feather portion is reduced in thickness an amount equal to the thickness of the upper materials to be employed in the shoe, a portion of the material cut from the shoe, a portion of the material cut from the feather portion being preferably utilized to form the inwardly projecting lip. The lip may have on its outer face a stiffening material such as shellac which renders the lip stiffer and more resistant to outward bending in response to the tension of a lasted upper which is to be secured thereto.

Considering the invention now in its method aspect as applied to the manufacture of the insole, an outside channel is first made, for example, by channeling inwardly from the edge face of the insole parallel to its bottom face a sufficient distance to form a wide feather. A portion, for example half, of the outer flap thus formed is trimmed off, and this operation may advantageously be performed simultaneously with the channeling operation. After tempering the insole, the remainder of the outer flap is turned upwardly and inwardly to a position such that it lies substantially flat against the bottom of the insole and forms a lip to which overlasted upper materials may be secured. While a lip thus formed and set in its inwardly turned condition possesses sufficient resistance to meet some conditions, it is desirable under other conditions further to stiffen the lip to render it more resistant to the outward pull of upper materials which are to be secured in lasted relation to the lip. Accordingly, a stiffening medium is applied to the lip after the insole has become dry. Preferably the stiffening medium is applied to the outer face only of the lip which, however, may include the shoulder portion of the lip. A solution of shellac containing acetone has been found to be very suitable for use as the stiffening medium, though, of course, other stiffening agents may be employed if desired. The drying of the stiffening material upon the single lip of the insole causes the lip to be so stiffened and strengthened that it offers sufficient resistance to being bent outwardly adequately to withstand the outward pull of the upper materials of a shoe after they have been worked into lasted position and secured to it.

Preferably, the outer flap split from the insole in the channeling operation should be made substantially equal in thickness to the thickness of the upper materials which are to be used in the shoe, and, of course, by turning the flap inwardly a shoulder is provided at the inner edge of the reduced margin or feather of the insole against which a shoe upper may be wiped so that the upper will have its inner marginal portion located in upstanding relation to the insole. This insures that an upper which has been secured in lasted relation to the insole will be in a convenient position for trimming.

The above and other aspects of the invention will appear more fully from the following detailed description when read in connection with the accompanying drawing and will be pointed out in the appended claims.

Figure 1:
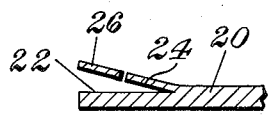
Fig. 1 is a sectional detail view illustrating the channeling operation upon the insole.
Figure 3:
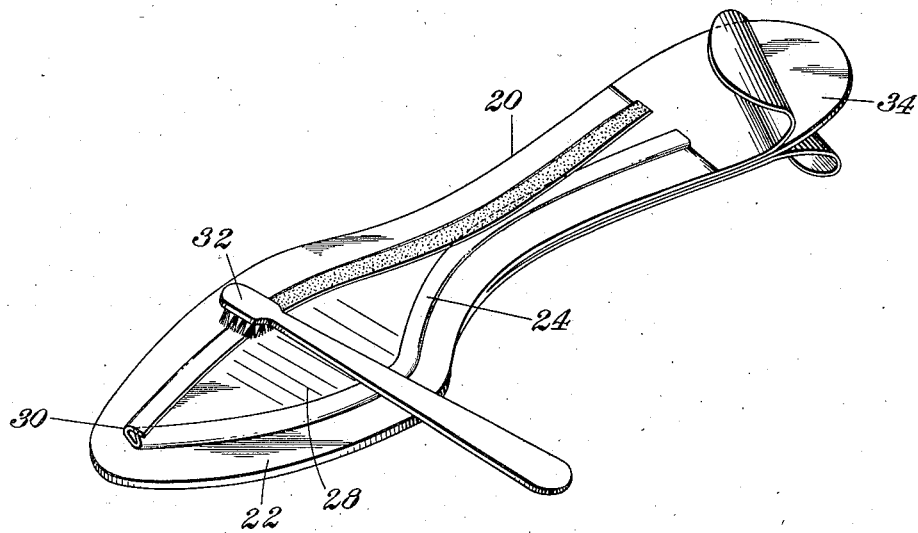
Fig. 3 is a perspective view of the insole showing its outer face and illustrating the application of a stiffening medium to the exposed surface of the lip.
Figure 2:
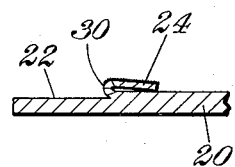
Fig. 2 is a similar view of the insole after the lip is turned.

In the illustrated method of making insoles the insole may first be provided with an outside channel, that is, a channel cut from an outer portion of the insole inwardly. As illustrated in Figs. 1, 2 and 3, an insole 20, preferably of leather, is channeled inwardly from its edge face to form a feather surface 22 parallel to its bottom face for a distance equal to the amount it is desired to have a shoe upper overlap the margin of the insole, for example, from three-eighths to about half an inch at the forepart, the channel extending inwardly seven-sixteenths or more at the portion of the shank adjacent to the breast line. The channel cut should preferably be spaced from the outer face of the insole a distance substantially equal to the thickness of the upper materials of the shoe in which the insole is to be used. The outer portion 26 of the outer flap 24, formed by the channeling operation, is trimmed off and this may be done simultaneously with the channeling operation. The forepart of the insole may be flexed by forming therein the usual slashes 28. To facilitate turning the outer flap 24 over upon the insole, the toe portion of the flap is snipped off, as indicated in Fig. 3, before the flap is turned to form a shoulder portion 30 and this snipping may be effected by a reciprocating knife extending across the toe of the insole at a distance from its end equal to the width of the feather 22, the action of the knife being so limited that it does not cut into the feather portion but only through the outer flap. That portion of the outer flap 24 at the end of the toe which would interfere with the turning inwardly of the side portions of the flap is thus removed and a space is provided between the bases of the two flaps at the toe end of the insole. The insole is next tempered by applying moisture to its outer face and is then subjected to a lip turning operation by which the outer flap 24 is turned inwardly over upon the body of the insole and pressed flat, as shown in Figs. 1 and 2, the outer flap thus forming a lip or rib 24 (Figs. 2 and 3) to which a lasted upper may be secured. When, after the turning operation, the insole has become sufficiently dry, a stiffening medium is applied to the outer surface of the lip or rib 24, as indicated by stippling in Figs. 2 and 3. Since this surface is substantially parallel to the plane of the bottom of the insole and is raised therefrom by an amount equal to the thickness of the lip, the stiffening solution may conveniently be applied to the outer face of the lip without liability of getting the solution on the feather of the insole where it would interfere with the adhesion of the cement which is to be used in securing an upper thereto and without liability of getting the solution on the interior portion of the insole where it would tend to stiffen the portion of the insole which it is desired to maintain as flexible as possible. The solution may be also applied to the shoulder portion 30 of the insole.

While various materials, such as glue or pyroxylin cement, may be employed as the stiffening medium, a solution of shellac, alcohol and acetone substantially in the following proportions has been found to be most satisfactory for that purpose:

Denatured alcohol _____quarts__ 3½
Shellac_____pounds__ 3
Acetone _____pound__ 1

This solution may conveniently be applied by hand, a small stiff brush 32 having its bristles cut off square being convenient for the purpose. While, as illustrated, the stiffening solution is applied only to the outer surface of the lip 24, including if desired the shoulder portion 30, the solution, by reason of its actone content, tends to penetrate deeply into the fibers of the leather, the lip being thus impregnated with the stiffening material. In order to stiffen the shank and heel portions of the insole, it may be split from its rear end to a point adjacent to the ball line, about where the insole begins to widen at the forepart, and a piece of fiberboard 34 may then be inserted in the split portion as shown in Fig. 3, the fiberboard being preferably secured in position by cement such, for example, as water-dispersed rubber cement or latex.

Having thus described the invention, what is claimed as new and desired to be secured by Letters Patent of the United States is:

1. An insole having a reduced feather portion and an inwardly extending lip of less width than the feather, said lip being disposed against the outer face of the insole and being set in that position with the aid of a stiffening medium to cause the lip to resist being brought to an upright position.

2. An insole having a wide feather portion of reduced thickness and a lip of approximately one-half the width of the feather, said lip extending inwardly from the inner edge of the feather and being stiffer than the body of the insole so that it lies substantially flat against the outer face of the insole.

3. An insole having a reduced feather portion and a lip of less width than the feather formed from an outer portion of the insole, said lip extending inwardly and lying flat against the outer face of the insole and having its outer portion impregnated with stiffening material.

4. An insole having an integral lip extending inwardly and lying substantially flat against the surface of the insole, said lip being impregnated with shellac.

5. An insole having an inwardly disposed lip substantially parallel to the surface of the insole, and lip stiffening material upon the outer face of the lip.

6. An insole having a lip formed from a portion of the outer margin of the insole, said lip being disposed substantially flat against the outer face of the insole and having its outer portion impregnated with a lip stiffening material.

7. An insole having a lip formed from an outer portion of the margin of the insole, said lip being disposed substantially flat against the outer face of the insole and having its exposed face impregnated with shellac.

8. An insole having a wide feather portion extending around the margin of the insole from breast line to breast line, and a lip at each side of the insole extending inwardly from the inner edge of the feather, said lips being discontinuous at the toe with their ends in close proximity and being stiffer than the rest of the insole so the full widths of the lips will resist being brought into an upright position.

9. That improvement in methods of making insoles which consists in channeling in from the edge face of an insole parallel to its inner face, removing the outer part of the outer flap thus formed, tempering the insole, turning the remaining portion of the outer flap inwardly flat against the surface of the insole, and allowing the insole to dry and the lip to become set in that position.

10. That improvement in methods of making insoles which consists in forming a lip on an insole by an outside channeling operation, and folding the lip thus formed inwardly to cause the lip to assume a sharply acute angle to the body of the insole and to offer maximum resistance to being bent outwardly, and stiffening the lip while in that position.

11. That improvement in methods of making insoles which consists in forming a lip on an insole by an outside channeling operation, folding the lip thus formed inwardly, and applying to the outer face of the lip a lip stiffening medium.

12. That improvement in methods of making insoles which consists in channeling from the outer portion of an insole inwardly to form a lip, turning the lip inwardly flat against the surface of the insole, and applying stiffening material to the exposed face of the lip.

13. That improvement in methods of making insoles which consists in forming a lip on an insole by an outside channeling operation, folding the lip thus formed inwardly against the surface of the insole thereby forming a feather and a shoulder on the margin of the insole, and applying to the outer face of the lip only a solution of shellac containing acetone to impregnate and stiffen the lip.

14. That improvement in methods of making insoles which consists in channeling in from the edge face of an insole parallel to the inner face thereof and removing substantially half of the outer flap thus formed, turning the remaining portion of the outer flap inwardly substantially flat against the surface of the insole, and impregnating the outer portion of said flap with stiffening material.

15. That improvement in methods of making insoles which consists in forming a lip on an insole by an outside channeling operation, folding the lip thus formed inwardly against the surface of the insole, and applying to the outer face of the lip a solution of shellac to stiffen the lip.

16. That improvement in methods of making insoles which consists in forming a lip on an insole by an outside channeling operation, folding the lip thus formed inwardly against the surface of the insole, and applying to the outer face of the lip a solution of shellac containing acetone to stiffen the lip.

17. That improvement in methods of making insoles which consists in channeling in from the edge face of an insole parallel to its inner face to form an outer flap substantially equal in thickness to the thickness of upper materials for a shoe, removing the outer portion of the flap thus formed, turning the remaining portion of the flap inwardly against the surface of the insole, and impregnating the exposed surface of the flap with shellac to stiffen it.

18. That improvement in methods of making insoles which consists in channeling in from the edge face of an insole parallel to its inner face to form an outer flap substantially equal in thickness to the thickness of upper materials for a shoe, removing the outer half of the flap thus formed, turning the remaining portion of the flap inwardly against the surface of the insole, and impregnating the exposed surface of the flap with stiffening material.

19. That improvement in methods of making insoles which consists in channeling in from the edge face of an insole parallel to its outer face substantially three-eighths of an inch, removing the outer portion of the flap thus formed, turning the remaining portion of the flap inwardly flat against the surface of the insole, and applying stiffening material to the exposed face of the flap.

20. That improvement in methods of making insoles which consists in channeling in from the edge face of an insole parallel to the inner face, removing half of the outer flap thus formed, tempering the insole, turning the remaining portion of the outer flap inwardly flat against the surface of the insole, and, after the insole is dry, impregnating the outer portion of said lip with stiffening material.

21. That improvement in methods of making insoles which consists in channeling in from the edge face of an insole parallel to its inner face substantially three-eighths of an inch, removing the outer half of the flap thus formed, turning the remaining portion of the flap inwardly, causing it to lie flat against the surface of the insole, and applying stiffening material to the outer surface only of the flap.

22. That improvement in methods of making insoles which consists in forming a lip on an insole by an outside channeling operation, folding the lip thus formed inwardly against the surface of the insole to form a feather or shoulder outside the lip, and applying to the outer face of the lip a solution of shellac containing acetone to impregnate and stiffen the lip.

23. That improvement in methods of making insoles which consists in channeling in from the edge face of an insole parallel to its inner face to form an outer flap substantially equal in thickness to the thickness of upper materials for a shoe, removing half of the outer flap thus formed, turning the remaining portion of the outer flap inwardly flat against the outer surface of the insole, and impregnating the outer portion of the flap with stiffening material.

ISABELLE W. GODDU.
*Executrix of the Will of George Goddu, Deceased.*